United States Patent

[11] 3,551,597

[72] Inventor James L. Russell
York, Pa.
[21] Appl. No. 671,424
[22] Filed Sept. 28, 1967
[45] Patented Dec. 29, 1970
[73] Assignee The Bendix Corporation
a corporation of Delaware

[54] TELEPHONE TELEMETRY
6 Claims, 3 Drawing Figs.

[52] U.S. Cl. .......... 179/2, 179/84
[51] Int. Cl. .......... H04m 11/02
[50] Field of Search .......... 179/2, 2RC, 15LL, 15SIG, 84, 84SS, 2DR; 340/151, 183

[56] References Cited
UNITED STATES PATENTS 3,351,919 11/1967 Milford .......... 179/2 (DP)
3,226,489 12/1965 Grambsch .......... 179/84
3,376,389 4/1968 Fair .......... 179/2(R)

*Primary Examiner*—Ralph D. Blakeslee
*Attorneys*—Plante, Arens, Hartz & O'Brien and Bruce L. Lamb

ABSTRACT: A telemetry system used with conventional domestic telephones for automatically reading remotely located utility meters utilizing an interrogator which dials the remotely located telephone and superimposes on the ringing tone an interrogation tone. Also, a telemetering control circuit connected into the remote telephone circuit using a normally open bilateral switch and associated circuitry which normally holds the telephone ringing circuit open to suppress the first ringing tone burst. The first tone burst charges a capacitor which holds the switch open until the burst terminates, at which time, discharge of the capacitor turns on a silicon controlled rectifier which closes the bilateral switch so that subsequent ringing tone bursts activate the telephone ringing circuits. An interrogation tone filter passes the interrogation signal, if any, to turn on a second silicon controlled rectifier controlling a metering circuit clock. The clock strobes a counter, in which is stored the desired meter reading in digital form, so as to make the counter read-out its stored data into the telephone line. Clock pulses are superimposed on the read-out data for synchronizing the interrogator. Turn on of the second silicon controlled rectifier causes the impedance across the telephone line to drop in a manner identical to the dropping of line impedance when the telephone is removed from its cradle, thereby turning off the ringing tone generator at the central exchange to prevent ringing of the subscriber telephone when interrogated.

INVENTOR

JAMES L. RUSSELL

BY Plante, Arens, Hartz & O'Brien

ATTORNEYS

JAMES L. RUSSELL
INVENTOR

BY Plante, Arens, Hartz & O'Brien
ATTORNEYS

TELEPHONE TELEMETRY

BACKGROUND OF THE INVENTION

The wide distribution of telephone lines and telephones has engendered interest in the use of existing commercial telephone systems for the automatic gathering of information, upon demand, from a remote location without the use of human operators. One of the most promising applications of telephone systems, from the mere standpoint of efficiency of gathering the information as compared with conventional methods of gathering such information, is in reading water, gas, electric and other type meters, wherever a telephone is available, from a central location and recording the readings directly on punch cards, tape, or other means compatible with known accounting machines.

One of the major shortcomings of systems proposed previously for remote demand telemetering over telephone lines was the unavoidable ringing of the telephone bell at the location being queried for information readout. Not only did this make interruption of the telemetering process by the telephone subscriber likely (by lifting the telephone from its cradle to answer its ring), but also precluded operation of the telemetering system during the night when it would have the least probability of interfering with or being degraded by normal telephone usage. Previous attempts to suppress ringing of the telephone did not react rapidly enough to completely suppress the bell action so that ringing of sufficient duration occurred to awaken sleepers or attract attention with resultant attempts by the telephone subscriber to answer the call, thereby interrupting the flow of telemetered data.

It is therefore an object of this invention to provide a means to automatically read, upon demand, remotely located data over the commercially available telephone system.

It is another object of this invention to read this data with only minimal interference with normal subscriber telephone usage.

It is another object of this invention to dispose simple subscriber terminal equipment of a single standard design which would suffice at all remote metered points with only the meter or other sensor differing for the various users.

Another object is to show how the subscriber terminal equipment can be added to existing commercial equipment without modification to telephone lines or exchange equipment.

A still further object of this invention is to disclose a telemetering system of the type described which will not irritate the telephone subscriber by ringing bells or evidencing other external indications of its operation.

SUMMARY OF THE INVENTION

Accordingly, a method of gathering telemetered data automatically over commercial telephone lines has been devised wherein an interrogator at a center location is arranged to dial or otherwise connect to the desired subscriber telephone and to transmit an interrogation signal immediately after the first ringing tone burst transmitted to the subscriber telephone. Subscriber terminal equipment has been devised which automatically suppresses the first ringing tone burst received and is tuned to respond to the interrogation signal to immediately transmit to the telephone central exchange a ringing tone inhibit signal and to additionally switch onto the telephone line the telemetered data requested. After completion of the data transmission, the subscribed terminal equipment will automatically terminate the call, restoring the subscriber's telephone to normal usage.

The telemetered data at the receiver will be interfaced with known accounting machines either directly or through the use of tape, punched cards or other means.

DESCRIPTION OF THE PREFERRED EMBODIMENT

Figure 1:
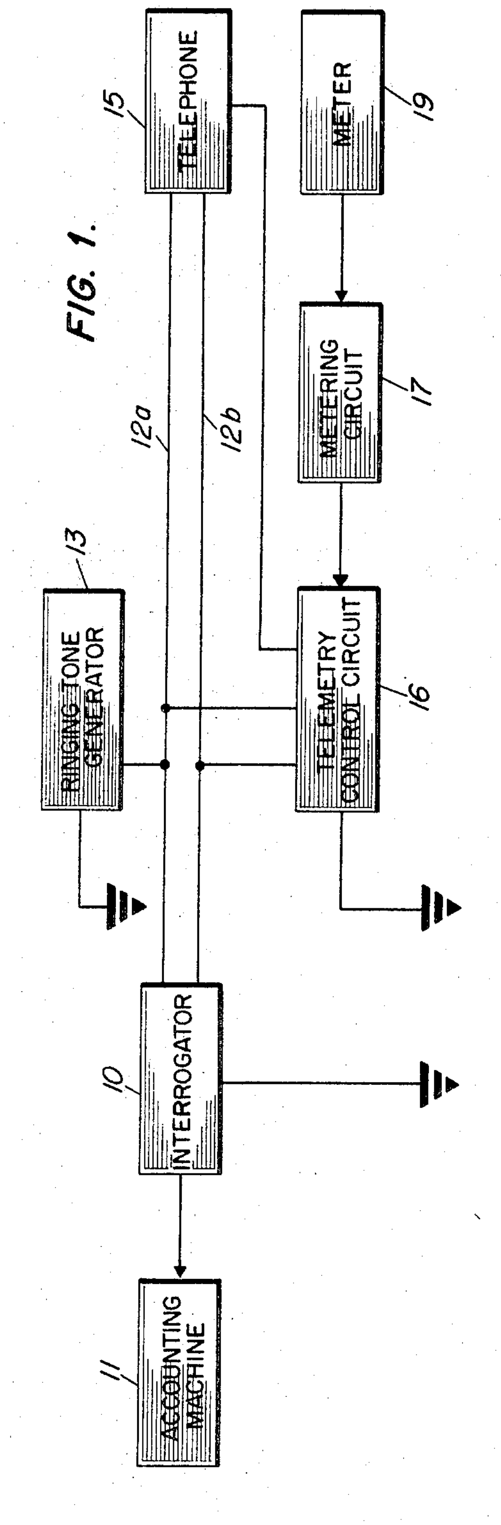
FIG. 1 is a block diagram of a telemetering system in accordance with the teachings of this invention.

Referring to FIG. 1, an interrogator 10, which includes an interrogation tone generator, is programmed to dial a desired telephone number. Immediately upon being connected to the subscriber terminal, the interrogator transmits over telephone lines 12*a* and 12*b* an interrogation signal from the interrogation tone generator simultaneously with the impressing of a ringing tone burst across the telephone lines by the ringing tone generator 13 located at the telephone system central exchange. The first ringing tone burst is suppressed by telemetering control circuit 16 in a manner to be described, and in response to the interrogation signal, the data contained in metering circuits 17 is transmitted over lines 12*a* and 12*b* to the interrogator. Simultaneously, the telemetering control circuit 16 also transmits to the central exchange a ringing tone inhibit signal which prevents further operation of ringing tone generator 13. The received data is fed to an accounting machine 11, along with the data identifying the subscriber either directly or through tape, punched cards or other conventional interface means.

Figure 2:
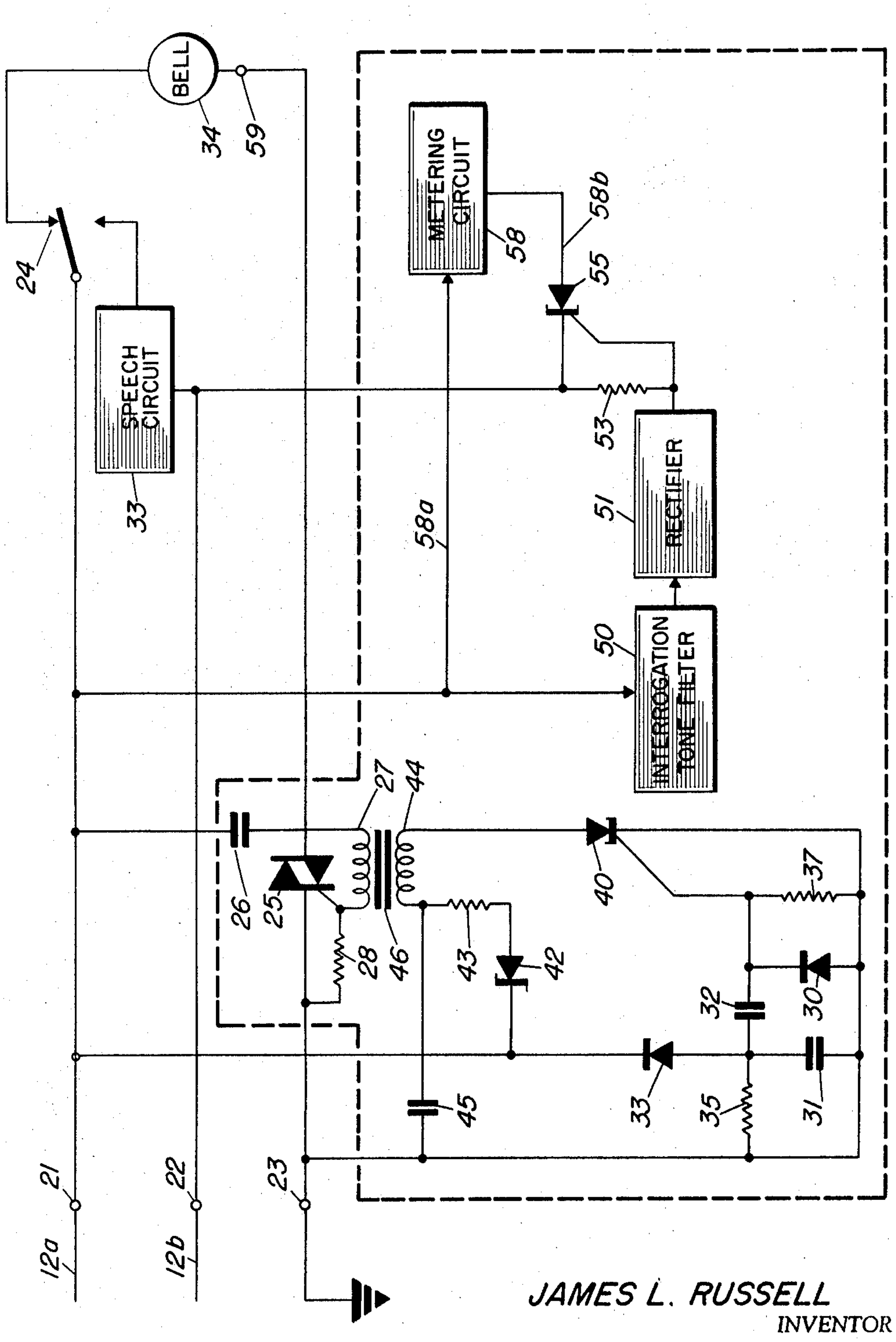
FIG. 2 is a schematic of subscriber terminal telemetering control circuitry.

Referring to FIG. 2, a conventional telephone line, such as would enter any location at which a telephone is installed, is connected to subscriber telephone terminals 21, 22 and 23. A ringing tone is applied between terminals 21 and 23 to actuate the telephone bell. In many installations, terminal 23, which is grounded is omitted and the return circuit for the ringing tone is through terminal 22 and line 12*b*. In any event, the installation of the telemetering circuit to be described below is into the ringing tone return circuit whether a two or three wire telephone system is involved. The telephone bell circuit is frequency sensitive and will respond to only one of a number of tones which might be used in a given telephone system.

When the telephone is resting in its cradle and no ringing tone is being applied, a DC voltage of 50 volts or somewhat less exists between terminals 21 and 22 with a source impedance which varies with the distance from the central exchange but which is not usually too widely different from the nominal value of 600 ohms. A switch 24 within the telephone disconnects terminal 21 from the speech circuits 33 of the telephone and connects it to the ringing circuit including bell 34. When the number of the particular telephone is dialed, the exchange selects the line to that telephone and impresses the ringing tone either across terminals 21 and 22 or between terminals 21 and 23 (ground). The ringing signal is an alternating voltage superimposed on the DC line potential and may be as much as 250 volts peak-to-peak with a frequency of the order of 20 Hertz or less. Usually, the ringing tone is applied in bursts with a quiescent period between bursts approximately equal to the burst length. When the telephone is lifted from the cradle, the ringing circuitry in the telephone is disconnected from terminal 21 and the speech circuitry is connected between terminals 21 and 22. The impedance of the speech circuitry is adjusted for variations in distance from the exchange but, in general, is sufficiently low to cause the DC voltage across the line to drop to 8 volts or less and to cause a 0.1 ampere current to flow between the telephone and the exchange. This line current operates switching equipment at the exchange to disconnect the ringing tone generator to prevent its interfering with speech or other data transmission.

In the embodiment of my invention, a switch 25, of the type commonly known as a "Triac," is inserted into the ringing tone return circuit. Switch 25 is a device which conducts in either direction provided it is biased in the same direction with a control voltage of at least approximately 3 volts. As the AC current flowing through the switch goes through zero, the switch unlatches and will not conduct again until the gate is reenergized. After being energized, even momentarily, the switch triggers to the conducting state and remains there until current through it falls to zero again.

In operation, switch 25 is normally not biased and therefore is normally nonconductive since the AC signal applied to its gate terminal by the voltage divider comprising capacitor 26, transformer secondary winding 27 and resistor 28 connected across terminals 21 and 23, is inadequate, even during the high-voltage ringing tone bursts, to trigger it into the conducting state. Thus, whenever the telephone is called, the first ringing tone burst will not be passed to the telephone bell 34 and no bell action will result. However, the first tone burst will be rectified by diode 33 to charge capacitors 31 and 32. At the end of the burst, capacitor 31 discharges through resistor 35 and its common terminal with capacitor 32 will go to ground. Resistor 37 is of such high value that capacitor 32 will discharge at a slow rate, so that the voltage at the junction of diode 30 and capacitor 32 will rise thereby raising the gate potential of silicon controlled rectifier 40 above the threshold and thereby switching it to the conducting state. SCR 40 will thereafter continue to conduct so long as its anode is maintained positive with respect to its cathode. The anode is made positive by the DC voltage on terminal 21 (which is now in its unloaded or high-voltage state) applied through Zener diode 42, resistor 43 and transformer primary winding 44. Capacitor 45 is provided to filter the ringing tone so as to prevent the current from dropping to zero during negative ringing tone half cycles. Zener diode 42 is selected to require a voltage greater than the loaded (low-voltage) DC line voltage, about 12 volts, before current will flow therethrough.

The flow of DC current through primary winding 44 saturates core 46 and reduces the impedance of winding 27 sufficiently to let the ringing tone voltage at the gate of switch 25 rise to the trigger threshold. Thus, if nothing acts to modify the above condition, following ringing tone bursts will pass through switch 25 to activate the telephone bell in the conventional manner. When the telephone is lifted from its cradle switch 24 operates to open the bell circuit and place speech circuit 33 across terminals 21 and 22. The load placed across the line will drop the DC line voltage below the Zener diode 42 threshold so that the impedance of winding 27 returns to its initial value, thereby removing the bias from switch 25 and rendering it nonconductive. Additionally, interruption of the current through SCR 40 renders it nonconductive. Since lifting the telephone from its cradle caused the exchange to disconnect the ringing tone generator, the control circuitry cannot be reenergized so that the telephone will now operate in the conventional manner.

If a two-wire telephone is used, switch 25 is connected from terminal 59 to terminal 22 rather than from terminal 59 to terminal 23 as shown in FIG. 2. It should be clear that the operation of the telemetering control circuit is identical whether a two- or three-wire telephone is used.

The interrogation signal here embodied is a single tone, selected to be outside normal speech frequencies but within the band-pass of the telephone lines and repeater equipment. It could take other forms such as digitally-coded signals, if desired, to reduce the probability of accidental or deliberate actuation of the telemetry circuits by unauthorized persons. If the telephone has been called by the interrogator, the interrogation signal is present on the line and is passed by the interrogation tone filter 50 and rectified by rectifier 51 to produce a positive potential across resistor 53 and hence the cathodegate junction of silicon controlled rectifier 55, which is thereby switched to the conductive state so long as it remains forward biased across its anode to cathode terminals. Silicon controlled rectifier 55 connects the metering circuits 58 to terminals 21 and 22. Metering circuits 58 are designed to permit the same flow of DC current as would be produced by lifting the telephone from its cradle and connecting its speech circuits to the line. This flow of current causes the exchange to disconnect the ringing tone generator and the telemetering control circuitry to return to its preringing state, except that the metering circuits are connected to the telephone line as long as silicon controlled rectifier 55 is conductive.

It should now be clear that a plurality of interrogation tone filters could be used, each tuned to respond to a different interrogation frequency and each controlling a separate metering circuit where a plurality of meters were to be read such as gas, water, electric, etc., meters. In this manner, the interrogating tone would determine which meter was to be read. If coded interrogation signals are used, the interrogation tone filters would be replaced by decoders to control the flow of data.

Figure 3:
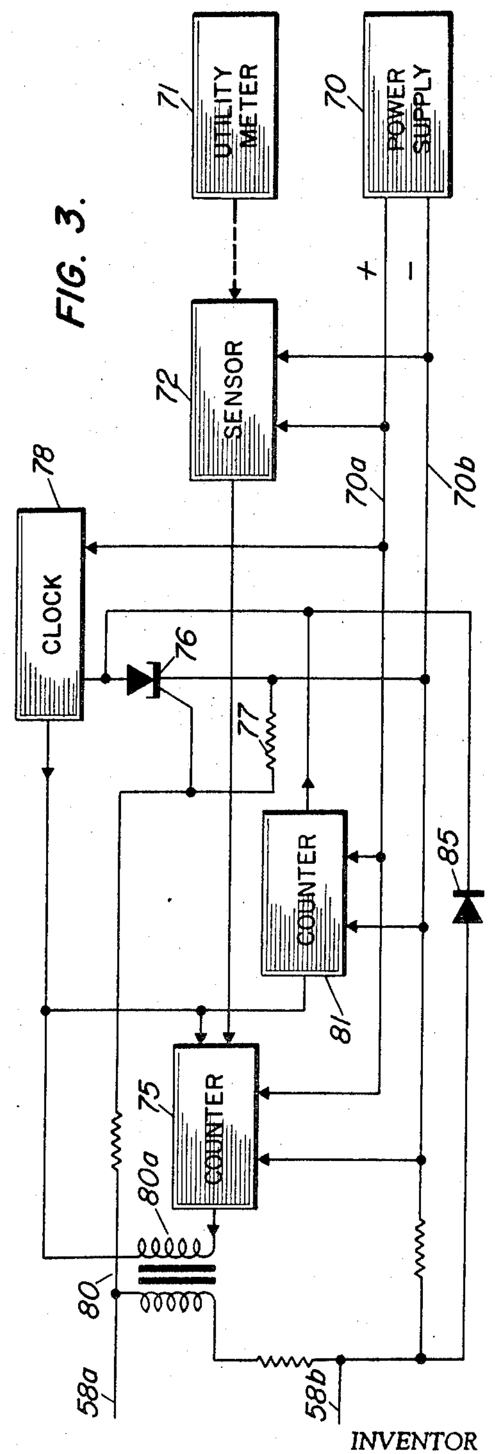
FIG. 3 is a block diagram of a metering circuit used with the disclosed telemetering control circuitry.

Referring to FIG. 3, there is seen a block diagram showing in greater detail metering circuit 58 of FIG. 1 and wherein, a power supply 70, energized in the conventional manner, supplies power to the circuit. A utility meter, such as a gas, electric or water meter, which is to be read, drives a sensor 72 which produces a single output pulse for each minimum increment of interest in the utility meter reading. Sensor 72 might suitably be a switch producing a simple switch closure at each increment of reading. The sensor drives a binary counter 75 which is composed of a number of cascaded flip-flops and comprises an integrated circuit. A counter having 20 flip-flops will count up to 1,156,783 increments which will be more than adequate for any meter reading likely to be encountered. Integrated circuit counters of this length are inexpensive and readily available.

When the subscriber terminal is interrogated so that silicon controlled rectifier 55 in FIG. 2 becomes conductive, the resultant voltage drop across resistor 77 turns on silicon controlled rectifier 76. Clock 78 is thereby connected to the negative power line **70*b* so as to initiate operation of the clock to generate a train of clock pulses at a 1000 pulse per second rate, which is compatible with telephone equipment characteristics. The clock pulses are used to strobe counter 75 so as to cause its digital contents to be read-out into primary winding 80*a*. Simultaneously, the clock pulses are also applied to winding 80*a* so as to superimpose "spikes" on the digital data to be used for synchronizing decoding equipment at the interrogator. The resultant data stream is coupled through transformer 80** to the telephone lines for transmission to the interrogator.

Clock pulses are also applied to counter 81 which generally has $m$—stages such that $2^{m-1}$ is equal to or greater than the number of stages in counter 75. After $2^{m-1}$ clock pulses, counter 81 generates a negative output pulse which is applied to the anode of silicon controlled rectifier 76 and through diode 85 and line **58*b* to the anode of silicon controlled rectifier 55 in FIG. 2, thereby turning off and unlatching these rectifiers. The telephone, telephone lines and associated equipment are then ready for normal telephone operation. Counter 75 is reset to all zeros and is ready to accumulate additional changes in meter reading. Assuming a clock frequency of 1.0 kHz and 20 stages in counter 75**, the entire meter reading has occupied the subscriber's telephone for not more than the time required for one ringing tone burst plus slightly more than 20 milliseconds. One customer can be easily interrogated in 6 seconds. Since, however, only slightly more than 20 milliseconds is required for data transmission in each 6 second interrogation period, almost 300 separate telephone lines can be used in time-division multiplex to feed up to 180,000 readings per hour into a single recording system.

Although telemetering of digitally encoded data has been shown it should be clear that data contained in any frequency, amplitude or pulse-modulated signal suitable for transmission over telephone lines can be telemetered using the principles of this invention. Certain other alternations and modifications in this preferred embodiment of my invention will become apparent to one skilled in the art. Therefore, not wishing to limits my invention to the specific form shown, I hereby claim as my invention all the subject matter, including modifications and alternations thereof encompassed by the scope and spirit of the appended claims.

I claim:

1. In a telephone system, including at least one remote telephone having switchable ringing and speech circuits, said system also including transmission lines terminated by said telephone and a ringing tone generator, normally disabled by a change in the termination impedance of said transmission lines, for applying bursts of ringing tones to said telephone ringing circuit, telemetry means using said telephone system for transmitting stored data comprising:

an interrogator for dialing the call number of said remote telephone and applying an interrogation signal to said telephone;

a normally open switching means connected into the ringing circuit of said telephone;

means responsive to the termination of the first ringing tone burst for closing said switching means;

a source of clock pulses;

a first counter for storing data in form suitable for transmission over said transmission lines, said first counter being strobed by said clock pulses to read out said data;

a first unilaternal semiconductor switching means responsive to at most a first momentary gating bias to initially trigger into a conductive state and thereafter responsive to a first forward bias for maintaining itself in a conductive state;

means responsive to said interrogation signal for generating and applying said first gating bias to said first unilaternal switching means;

a second unilateral semiconductor switching means responsive to at most a second momentary gating bias to initially trigger into a conductive state and thereafter responsive to a second forward bias to maintain itself in a conductive state for energizing said source of clock pulses;

means responsive to the conductive state of said first unilateral switching means for applying said second gating signal to said second unilateral switching means; and a source of electrical power for supplying said first and second forward bias.

2. A telemetry system as recited in claim 1 with additionally a second counter strobed by said clock pulses for generating and applying a disable signal to said first and second unilateral switching means.

3. A telemetry system as recited in claim 1 wherein said first and second unilateral switching means comprise silicon controlled rectifiers.

4. A telemetry means as recited in claim 1 wherein:

said normally open switching means comprises a third semiconductor switching means having a gate circuit; and, said means for closing said switching means includes:

a first capacitive means charged by said ringing tone burst and having a short time constant discharge path;

a second capacitive means charged by said ringing tone burst and having a long time constant discharge path, the voltage on said second capacitive means varied by the discharge of said first capacitive means;

a fourth semiconductor switching means responsive to at most a momentary gating bias to initially trigger into a conductive state and thereafter responsive to a forward bias to maintain itself in a conductive state; said voltage variance on said capacitive means supplying said gating bias; and means responsive to the conductive state of said fourth switching means for applying a gating signal to said third semiconductor switching means gate circuit.

5. A telemetry means as recited in claim 4 wherein said third semiconductor switching means gate circuit is connected to receive said ringing tone bursts.

6. A telemetry means as recited in claim 1 wherein:

said normally open switching means comprises a third semiconductor switching means having a gate circuit and being conductive in accordance with the impedance of said gate circuit; said means for closing said switching means includes:

a first capacitive means charged by said ringing tone burst and having a short time constant discharge path;

a second capacitive means charged by said ringing tone burst and having a long time constant discharge path, the voltage on said second capacitive means being varied by the discharge of said first capacitive means;

a fourth semiconductor switching means responsive to at most a momentary gating bias to initially trigger into a conductive state and thereafter responsive to a forward bias to maintain itself in a conductive state, said voltage variance on said second capacitive means supplying said gating bias; and a variable impedance means responsive to the conductive state of said fourth switching means for varying the impedance of said third switching means gate circuit.